United States Patent
Huang et al.

(10) Patent No.: US 10,231,257 B2
(45) Date of Patent: Mar. 12, 2019

(54) BASE STATION, SMALL CELL, AND METHOD FOR SCHEDULING COMMUNICATIONS LINK RESOURCE

(71) Applicant: HUAWEI TECHNOLOGIES CO., LTD., Shenzhen, Guangdong (CN)

(72) Inventors: Lei Huang, Shanghai (CN); Jian Li, Shanghai (CN); Yongming Liang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 15/247,938

(22) Filed: Aug. 26, 2016

(65) Prior Publication Data
US 2017/0006627 A1   Jan. 5, 2017

Related U.S. Application Data

(63) Continuation of application No. PCT/CN2014/072621, filed on Feb. 27, 2014.

(51) Int. Cl.
*H04W 72/12* (2009.01)
*H04W 72/04* (2009.01)
(Continued)

(52) U.S. Cl.
CPC ....... *H04W 72/1278* (2013.01); *H04W 16/32* (2013.01); *H04W 72/0406* (2013.01);
(Continued)

(58) Field of Classification Search
None
See application file for complete search history.

(56) References Cited

U.S. PATENT DOCUMENTS

| 2008/0220790 A1 | 9/2008 | Cai et al. |
| 2010/0034163 A1 | 2/2010 | Damnjanovic et al. |

(Continued)

FOREIGN PATENT DOCUMENTS

| CN | 101908955 A | 12/2010 |
| CN | 102013903 A | 4/2011 |

(Continued)

OTHER PUBLICATIONS

IEEE Std 802.11ad™-2012 IEEE Standard for Information technology—Telecommunications and information exchange between systems Local and metropolitan area networks—Specific requirements ,Part 11: Wireless LAN Medium Access Control (MAC) and Physical Layer (PHY) Specifications Amendment 3: Enhancements for Very High Throughput in the 60 GHz Band , Dec. 28, 2012. total 628 pages.

(Continued)

*Primary Examiner* — Jason E Mattis
*Assistant Examiner* — Hong Shao
(74) *Attorney, Agent, or Firm* — Leydig, Voit & Mayer, Ltd.

(57) ABSTRACT

The present invention relates to a base station, a small cell, and a method for scheduling a communications link resources. A first small cell reports load information and channel state information of a channel between the first small cell and a neighboring second small cell to a base station. The first small cell receives link pre-scheduling signaling from the base station. The link pre-scheduling signaling includes wireless resource occupation information that indicates an occupancy of a wireless resource of the first small cell by a backhaul link. The first small cell allocates a first wireless resource in available wireless resources to the backhaul link according to the channel state information and the wireless resource occupation information, and allocates (Continued)

a second wireless resource in the remaining available wireless resources to an access link used for data transmission between the first small cell and a user equipment device.

12 Claims, 9 Drawing Sheets

(51) Int. Cl.
  *H04W 16/32* (2009.01)
  *H04W 16/26* (2009.01)
  *H04W 88/02* (2009.01)

(52) U.S. Cl.
  CPC ........ *H04W 72/0446* (2013.01); *H04W 16/26* (2013.01); *H04W 88/02* (2013.01)

(56) References Cited

U.S. PATENT DOCUMENTS

| | | |
|---|---|---|
| 2010/0226335 A1 | 9/2010 | Sampath et al. |
| 2010/0238826 A1* | 9/2010 | Borran .................. H04W 16/02 370/252 |
| 2010/0254301 A1 | 10/2010 | Blankenship et al. |
| 2011/0182174 A1 | 7/2011 | Pi et al. |
| 2012/0044852 A1* | 2/2012 | Zhang ................ H04B 7/15528 370/312 |
| 2012/0122507 A1 | 5/2012 | Gao et al. |
| 2012/0140682 A1 | 6/2012 | Reed et al. |
| 2012/0213171 A1 | 8/2012 | Jeong et al. |
| 2013/0053078 A1* | 2/2013 | Barbieri ................ H04B 7/024 455/509 |
| 2013/0090055 A1* | 4/2013 | Pitakdumrongkija et al. .............. H04B 7/15 455/9 |
| 2013/0142136 A1 | 6/2013 | Pi et al. |
| 2013/0142288 A1 | 6/2013 | Dinan |
| 2014/0056282 A1 | 2/2014 | Sun et al. |
| 2016/0112965 A1 | 4/2016 | Damnjanovic et al. |

FOREIGN PATENT DOCUMENTS

| | | |
|---|---|---|
| CN | 102113359 A | 6/2011 |
| CN | 103167508 A | 6/2013 |
| CN | 103299685 A | 9/2013 |
| EP | 2698028 B1 | 4/2018 |
| JP | 2010521109 A | 6/2010 |
| JP | 2011193507 A | 9/2011 |
| JP | 2012521675 A | 9/2012 |
| KR | 20120095018 A | 8/2012 |
| RU | 2474088 C2 | 1/2013 |
| WO | 2010145710 A1 | 12/2010 |
| WO | 2013125226 A1 | 8/2013 |
| WO | 2013125228 A1 | 8/2013 |

OTHER PUBLICATIONS

IEEE Std 802.15.3c-2009, IEEE Standard for Information technology—telecommunications and information exchange between systems Local and metropolitan area networks—Specific requirements ,Part15. 3: wireless medium access control(MAC) and physical layer(phy)specifications for high rate wireless personal area networks(WPANs), amenment 2: millimeter-wave-based alternative physical layer extension. Oct. 12, 2009. total 203 pages.
ECMA-387, High Rate 60 GHz PHY, MAC and PALs, © Ecma International, 2nd Edition / Dec. 2010. total 302 pages.

* cited by examiner

BASE STATION, SMALL CELL, AND METHOD FOR SCHEDULING COMMUNICATIONS LINK RESOURCE

CROSS-REFERENCE TO RELATED APPLICATIONS

This application is a continuation of International Patent Application No. PCT/CN2014/072621, filed on Feb. 27, 2014, which is hereby incorporated by reference in its entirety.

TECHNICAL FIELD

The present invention relates to the field of communication technologies, and in particular, to a base station, a small cell, and a method for scheduling communication link resources.

BACKGROUND

With an increasing demand for mobile data services, most low frequency band spectrum resources (for example, frequency bands lower than 3 GHz) suitable for mobile communications have been allocated. In a frequency range from 3 GHz to 300 GHz, spectrum resources have not been fully allocated. As defined by the International Telecommunication Union (ITU), the frequency band from 3 GHz to 30 GHz is a super high frequency (SHF) band, and the frequency band from 30 GHz to 300 GHz is an extreme high frequency (EHF) band. The SHF band and the EHF band have a similar propagation feature (i.e. a relatively high propagation loss). Their wavelength range is from 1 mm to 100 mm. Collectively, a frequency band from 3 GHz to 300 GHz is referred to as a millimetric wave band. It is important in millimetric wave band communications to establish an efficient mechanism for jointly scheduling a wireless backhaul resource and a wireless access resource, so as to improve resource usage efficiency and increase capacity of an entire network. Especially, when a backhaul link shares a millimetric wave band resource with an access link, the issue of properly allocating the wireless resources between the backhaul link and the access link should be carefully considered.

In the Third Generation Partnership Program (3GPP) Long Term Evolution (LTE) standards Release 10 (Rel-10), an in-band relay node (RN) is introduced. A backhaul link and an access link of the relay node share a wireless resource by means of time-division multiplexing (TDM). By semi-statically configuring a multimedia broadcast multicast service single frequency network (MBSFN) subframe, a resource is reserved for backhaul transmission. An evolved NodeB (eNB) is responsible for scheduling backhaul resources for RNs, and an RN is responsible for scheduling resources for user equipment (UE) devices connected to the RN. In a millimetric wave high frequency communications system, bursting demand for a large service flow is becoming more prominent. The backhaul resource and the access resource are scheduled separately. There exists a deficiency in resource usage of the system.

SUMMARY

According to a base station, a small cell, and a method for scheduling a communications link resource that are provided by the present invention, a backhaul link resource may be dynamically adjusted according to load of each small cell on a network, which helps improve resource usage efficiency of an entire network and increase a capacity of a system network.

According to a first aspect, an embodiment of the present invention provides a small cell, including:

a sending unit, configured to report load information and channel state information of a channel between the small cell and a neighboring small cell to a base station, where both a coverage range of the small cell and a coverage range of the neighboring small cell are within a coverage range of the base station;

a receiving unit, configured to receive link pre-scheduling signaling sent by the base station according to the load information and the channel state information, where the link pre-scheduling signaling includes wireless resource occupation information, and the wireless resource occupation information is used to indicate a case in which a wireless resource of the small cell is occupied by a backhaul link;

a scheduling unit, configured to allocate a first wireless resource in available wireless resources to the backhaul link of the small cell according to the channel state information and the wireless resource occupation information; and an allocating unit, configured to allocate a second wireless resource in the available wireless resources except the first wireless resource to an access link, where the access link is used for data transmission between the small cell and user equipment.

In a first possible implementation manner, the small cell further includes:

a determining unit, configured to determine whether resource reallocation needs to be performed for the backhaul link; where the sending unit is further configured to send information for requesting backhaul link resource reallocation to the base station; and the receiving unit is further configured to receive feedback instruction information sent by the base station according to the information for requesting backhaul link resource reallocation, where the feedback instruction information is used to instruct the small cell to report the load information and the channel state information to the base station.

According to a second aspect, an embodiment of the present invention provides a base station, including:

a receiving unit, configured to receive load information and channel state information that are reported by a small cell; and a sending unit, configured to send link pre-scheduling signaling to the small cell on a millimetric wave band according to the load information and the channel state information, where the link pre-scheduling signaling includes wireless resource occupation information, the wireless resource occupation information is used to indicate a case in which a wireless resource of the small cell is occupied by a backhaul link, and a coverage range of the small cell is within a coverage range of the base station.

In a first possible implementation manner, the base station further includes a determining unit;

the receiving unit is further configured to receive information for requesting backhaul link resource reallocation that is sent by the small cell;

the determining unit is configured to determine, according to load-related information of a backhaul link of the small cell, whether to perform wireless resource reallocation for the backhaul link of the small cell; and the sending unit is further configured to: when it is determined to perform wireless resource reallocation, send feedback instruction information to a small cell related to the wireless resource reallocation, where the feedback instruction information is used to instruct the small cell related to the wireless resource reallocation to report load information and channel state information to the base station.

According to a third aspect, an embodiment of the present invention provides a small cell, including:

a sending unit, configured to report load information and channel state information of a channel between the small cell and a neighboring small cell to a base station, where both a coverage range of the small cell and a coverage range of the neighboring small cell are within a coverage range of the base station;

a receiving unit, configured to receive link scheduling signaling sent by the base station according to the load information and the channel state information, where the link scheduling signaling includes wireless resource scheduling information, and the wireless resource scheduling information is used to allocate, to the small cell, a first wireless resource required by a wireless backhaul link of the small cell; and an allocating unit, configured to allocate a second wireless resource on the wireless backhaul link except the first wireless resource to an access link, where the access link is used for data transmission between the small cell and user equipment.

In a first possible implementation manner, the small cell further includes:

a determining unit, configured to determine a demand for backhaul link resource reallocation according to the load information; where the sending unit is further configured to send information for requesting backhaul link resource reallocation to the base station; and the receiving unit is further configured to receive feedback instruction information sent by the base station according to the information for requesting backhaul link resource reallocation, where the feedback instruction information is used to instruct the small cell to report the load information and the channel state information to the base station.

According to a fourth aspect, an embodiment of the present invention provides a base station, including:

a receiving unit, configured to receive load information and channel state information that are reported by a small cell; and a sending unit, configured to send link scheduling signaling to the small cell on a millimetric wave band according to the load information and the channel state information, where the link scheduling signaling includes wireless resource scheduling information, the wireless resource scheduling information is used to indicate a first wireless resource required by the small cell for accessing a wireless backhaul link, and a coverage range of the small cell is within a coverage range of the base station.

In a first possible implementation manner, the base station further includes a determining unit;

the receiving unit is further configured to receive information for requesting backhaul link resource reallocation that is sent by the small cell;

the determining unit is configured to determine, according to load-related information of the backhaul link of the small cell, whether to perform wireless resource reallocation for the wireless backhaul link of the small cell; and the sending unit is further configured to: when it is determined to perform wireless resource reallocation, send feedback instruction information to a small cell related to the wireless resource reallocation, where the feedback instruction information is used to instruct the small cell related to the wireless resource reallocation to report load information and channel state information to the base station.

According to a fifth aspect, an embodiment of the present invention provides a method for scheduling a communications link resource, including:

reporting, by a first small cell, load information and channel state information of a channel between the first small cell and a neighboring second small cell to a base station, where both a coverage range of the first small cell and a coverage range of the second small cell are with a coverage range of the base station;

receiving, by the first small cell, link pre-scheduling signaling sent by the base station according to the load information and the channel state information, where the link pre-scheduling signaling includes wireless resource occupation information, and the wireless resource occupation information is used to indicate a case in which a wireless resource of the first small cell is occupied by a backhaul link;

allocating, by the first small cell, a first wireless resource in available wireless resources to the backhaul link of the first small cell according to the channel state information and the wireless resource occupation information; and allocating a second wireless resource in the available wireless resources except the first wireless resource to an access link, where the access link is used for data transmission between the first small cell and user equipment.

In a first possible implementation manner, before the reporting, by a first small cell, load information and channel state information of a channel between the first small cell and a neighboring second small cell to a base station, the method further includes:

determining, by the first small cell, a demand for backhaul link resource reallocation according to the load information;

sending information for requesting backhaul link resource reallocation to the base station; and receiving feedback instruction information sent by the base station according to the information for requesting backhaul link resource reallocation, where the feedback instruction information is used to instruct the first small cell to report the load information and the channel state information to the base station.

According to a sixth aspect, an embodiment of the present invention provides a method for scheduling a communications link resource, including:

receiving, by a base station, load information and channel state information that are reported by a small cell; and sending link pre-scheduling signaling to the small cell on a millimetric wave band according to the load information and the channel state information, where the link pre-scheduling signaling includes wireless resource occupation information, the wireless resource occupation information is used to indicate a case in which a wireless resource of the small cell is occupied by a backhaul link, and a coverage range of the small cell is within a coverage range of the base station.

In a first possible implementation manner, before the receiving, by a base station, load information and channel state information that are reported by a small cell, the method further includes:

receiving, by the base station, information for requesting backhaul link resource reallocation that is sent by the small cell;

determining, according to load-related information of the backhaul link of the small cell, whether to perform wireless resource reallocation for the backhaul link of the small cell; and when it is determined to perform wireless resource reallocation, sending feedback instruction information to a small cell related to the wireless resource reallocation, where the feedback instruction information is used to instruct the small cell related to the wireless resource reallocation to report load information and channel state information to the base station.

According to a seventh aspect, an embodiment of the present invention provides a method for scheduling a communications link resource, including:

reporting, by a small cell to a base station, load information and channel state information of a channel between the small cell and a neighboring small cell, where both a coverage range of the small cell and a coverage range of the neighboring small cell are within a coverage range of the base station;

receiving, by the small cell, link scheduling signaling sent by the base station according to the load information and the channel state information, where the link scheduling signaling includes wireless resource scheduling information, and the wireless resource scheduling information is used to allocate, to the small cell, a first wireless resource required by a wireless backhaul link of the small cell; and allocating a second wireless resource in available wireless resources except the first wireless resource to an access link, where the access link is used for data transmission between the small cell and user equipment.

In a first possible implementation manner, before the reporting, by a small cell to a base station, load information and channel state information of a channel between the small cell and a neighboring small cell, the method further includes:

determining, by the small cell, a demand for backhaul link resource reallocation according to the load information;

sending information for requesting backhaul link resource reallocation to the base station; and receiving feedback instruction information sent by the base station according to the information for requesting backhaul link resource reallocation, where the feedback instruction information is used to instruct the small cell to report the load information and the channel state information to the base station.

According to an eighth aspect, an embodiment of the present invention provides a method for scheduling a communications link resource, including:

receiving, by a base station, load information and channel state information that are reported by a small cell; and sending link scheduling signaling to the small cell on a millimetric wave band according to the load information and the channel state information, where the link scheduling signaling includes wireless resource scheduling information, the wireless resource scheduling information is used to indicate a first wireless resource required by the small cell for accessing a wireless backhaul link, and a coverage range of the small cell is within a coverage range of the base station.

In a first possible implementation manner, before the receiving, by a base station, load information and channel state information that are reported by a small cell, the method further includes:

receiving, by the base station, information for requesting backhaul link resource reallocation that is sent by the small cell;

determining, according to load-related information of the backhaul link of the small cell, whether to perform wireless resource reallocation for the wireless backhaul link of the small cell; and when it is determined to perform wireless resource reallocation, sending feedback instruction information to a small cell related to the wireless resource reallocation, where the feedback instruction information is used to instruct the small cell related to the wireless resource reallocation to report load information and channel state information to the base station.

According to the base station, the small cell, and the method for scheduling a communications link resource that are provided by the embodiments of the present invention, a backhaul link resource is dynamically adjusted according to load of each small cell on a network, which improves resource usage efficiency of an entire network and increases a capacity of a system network.

DESCRIPTION OF EMBODIMENTS

The following describes the technical solutions in the embodiments of the present invention with reference to the accompanying drawings. Apparently, the described embodiments are merely some rather than all of the embodiments of the present invention. All other embodiments obtained by a person of ordinary skill in the art based on the described embodiments without creative efforts shall fall within the protection scope of the present invention.

Figure 1:
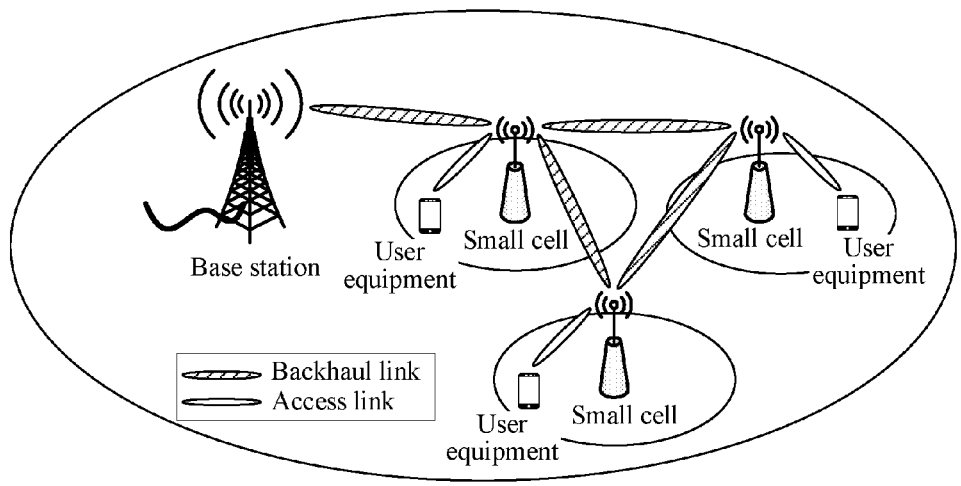
FIG. 1 is a schematic architecture diagram of a wireless communication network system.

In a network as schematically shown in FIG. 1, a base station provides control plane coverage in a relatively large area by using a conventional cellular frequency band (for example, 2 GHz) or a relatively low frequency millimetric wave band (for example, a 3.5 GHz band). The base station may communicate with small cells and user equipment devices by at the foregoing frequency bands. Small cells are low-powered radio access nodes that operate in licensed and unlicensed spectrum that have a range of 10 meters to 1 or 2 kilometers. Within the coverage range of the base station, multiple small cells are deployed to provide hotspot coverage. A small cell provides user plane coverage in a relatively small area by using a relatively high frequency millimetric wave band (for example, a 28 GHz band, a 38 GHz band, or an E-band). The small cell can communicate with the base station by using the conventional cellular frequency band or the relatively low frequency millimetric wave band, but it cannot communicate with the user equipment devices by using these frequency bands. User equipment devices within the coverage range of the small cell performs user plane data exchange with the small cell by using the relatively high frequency millimetric wave band, and performs control plane signaling exchange with the base station by using the cellular frequency band or the relatively low frequency millimetric wave band.

As a network anchor, the base station connects to a core network using optical fibers. The base station performs backhaul transmission with one or more small cells by using a millimetric wave band. A small cell performs backhaul transmission with the base station or another small cell by using a millimetric wave band. The small cell further performs access transmission with user equipment by using the same millimetric wave band.

All the following embodiments of the present invention correspond to the foregoing network architecture. It is assumed that a base station performs, by using a millimetric wave band of 3.5 GHz, control plane communication with a small cell and user equipment that are within a coverage range of the base station. The base station performs, by using a millimetric wave band of 28 GHz, data plane transmission on a backhaul link with one or more neighboring small cells of the base station. The small cell performs, by using the millimetric wave band of 28 GHz, user plane data communication with user equipment covered by the small cell. The small cell also performs, by using the same millimetric wave band, data plane transmission on a backhaul link with another small cell or a millimetric wave macro base station.

Embodiment 1

Figure 2:
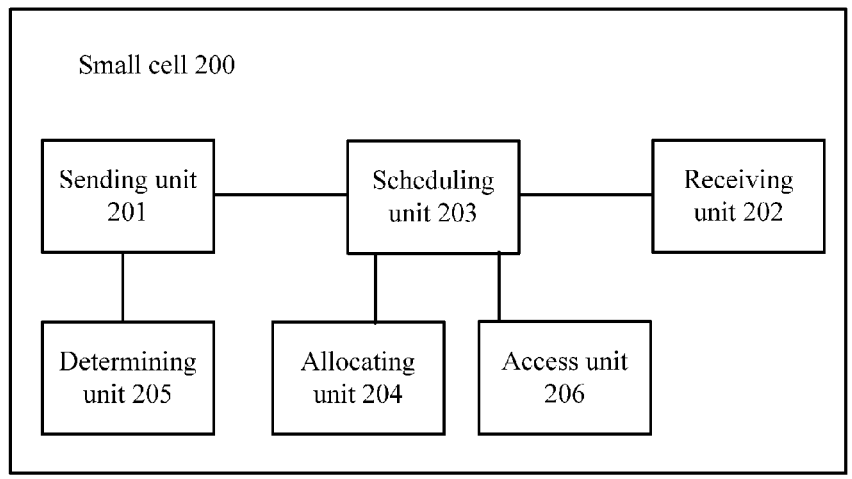
FIG. 2 is a functional block diagram of a small cell according to Embodiment 1 of the present invention.

FIG. 2 is a functional block diagram of a small cell according to Embodiment 1 of the present invention. As shown in FIG. 2, the small cell 200 includes a sending unit 201, a receiving unit 202, a scheduling unit 203, an allocating unit 204, and a determining unit 205. As understood by persons skilled in the art, these functional units can be realized by corresponding hardware components that constitute a network node.

The sending unit 201 is configured to report load information and channel state information of a channel between the small cell 200 and a neighboring small cell to a base station. A coverage range of the small cell 200 and a coverage range of the neighboring small cell are both within a coverage range of the base station.

The receiving unit 202 is configured to receive link pre-scheduling signaling from the base station. The link pre-scheduling signaling is generated by the base station according to the load information and the channel state information. The link pre-scheduling signaling includes wireless resource occupation information. The wireless resource occupation information indicates an occupancy of a wireless resource of the small cell 200 by a backhaul link.

The scheduling unit 203 is configured to allocate a first wireless resource in available wireless resources to the backhaul link of the small cell according to the channel state information and the wireless resource occupation information.

The wireless resource occupation information specifically includes: routing information between multiple small cells, size information of wireless resources on the wireless backhaul link, and master-slave relationship information and measurement configuration information of the multiple small cells. According to the received wireless resource occupation information and the channel state information, the small cell 200 schedules the neighboring small cell to access the wireless backhaul link by using the first wireless resource.

The allocating unit 204 is configured to allocate a second wireless resource in the remaining available wireless resources to an access link, where the access link is used for data transmission between the small cell 200 and a user equipment device.

The determining unit 205 is configured to determine, according to the load information, whether it is needed to perform a resource reallocation for the backhaul link.

For example, the load information includes cache occupancy information. When more than 80% of a cache is occupied, it is determined that a resource reallocation needs to be performed for the backhaul link.

The small cell 200 in this embodiment of the present invention further includes an access unit 206. The access unit 206 is configured for the small cell 200 to access the wireless backhaul link. After the scheduling unit 203 allocates the first wireless resource in the available wireless resources to the backhaul link of the small cell 200, the small cell 200 is enabled to access the wireless backhaul link by using the first wireless resource.

After the determining unit 205 determines that a resource reallocation needs to be performed for the backhaul link, the sending unit 201 sends information for requesting backhaul link resource reallocation to the base station.

The receiving unit 202 is further configured to receive feedback instruction information from the base station according to the information for requesting backhaul link resource reallocation. The feedback instruction information instructs the small cell 200 to report the load information and the channel state information to the base station.

Embodiment 2

Figure 3:
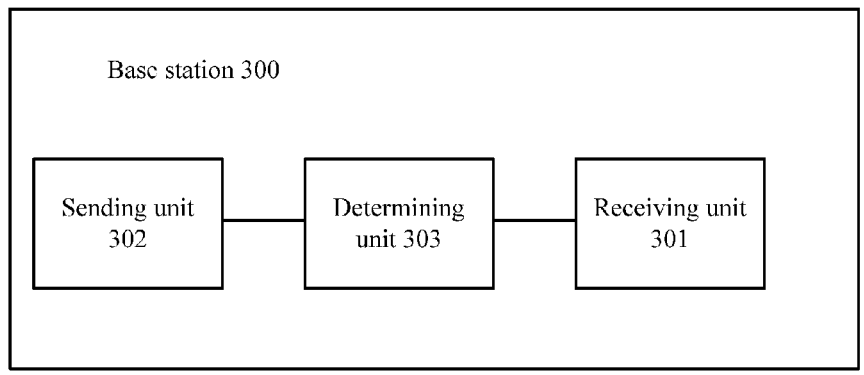
FIG. 3 is a functional block diagram of a base station according to Embodiment 2 of the present invention.

FIG. 3 is a functional block diagram of a base station according to Embodiment 2 of the present invention. As shown in FIG. 3, the base station 300 includes a receiving unit 301, a sending unit 302, and a determining unit 303. As understood by persons skilled in the art, these functional units can be realized by corresponding hardware components that constitute a base station of any type.

The receiving unit 301 is configured to receive load information and channel state information from a small cell.

The sending unit 302 is configured to send link pre-scheduling signaling to the small cell on a millimetric wave band according to the load information and the channel state information. The link pre-scheduling signaling includes wireless resource occupation information. The wireless resource occupation information indicates an occupancy of a wireless resource of the small cell by a backhaul link, and a coverage range of the small cell is within a coverage range of the base station.

The small cell determines, according to the load information of the small cell, whether the small cell has a demand for resource reallocation for a backhaul link, and when the small cell has a demand for resource reallocation, the receiving unit 301 is further configured to receive information for requesting backhaul link resource reallocation from the small cell.

The determining unit 303 is further configured to determine, according to load-related information of a backhaul link of the small cell, whether to perform a wireless resource reallocation for the wireless backhaul link of the small cell.

When it is determined that wireless resource reallocation needs to be performed for the wireless backhaul link of the small cell, the sending unit 302 sends feedback instruction information to the small cell. The feedback instruction information instructs the small cell to report load information and channel state information to the base station.

Embodiment 3

Figure 4:
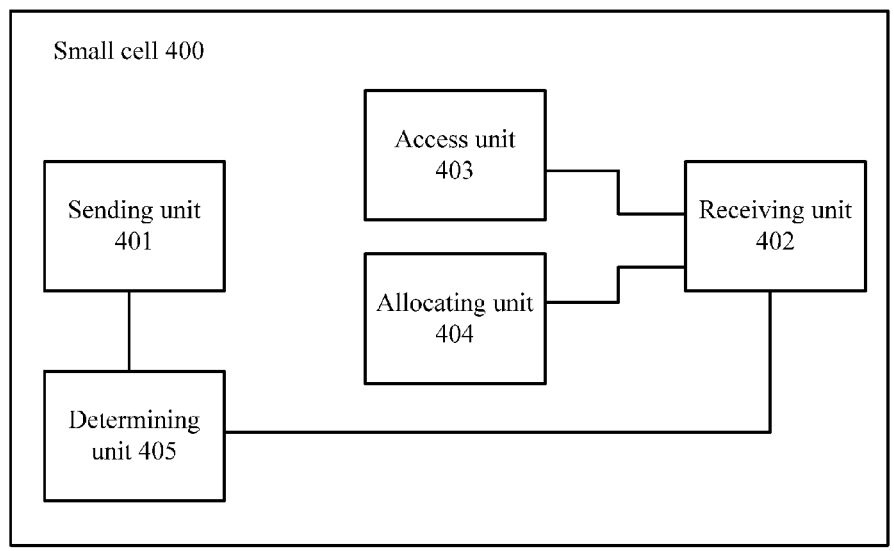
FIG. 4 is a functional block diagram of a small cell according to Embodiment 3 of the present invention.

FIG. 4 is a functional block diagram of a small cell according to Embodiment 3 of the present invention. As shown in FIG. 4, the small cell 400 includes a sending unit 401, a receiving unit 402, an access unit 403, an allocating unit 404, and a determining unit 405. As understood by persons skilled in the art, these functional units can be realized by corresponding hardware components that constitute a network node.

The sending unit 401 is configured to report load information and channel state information of a channel between the small cell 400 and a neighboring small cell to a base station. A coverage range of the small cell 400 and a coverage range of the neighboring small cell are both within a coverage range of the base station.

The receiving unit 402 is configured to receive link scheduling signaling from the base station. The link pre-scheduling signaling is generated by the base station according to the load information and the channel state information. The link scheduling signaling includes wireless resource scheduling information. The wireless resource scheduling information is used to allocate, to the small cell 400, a first wireless resource required by a wireless backhaul link of the small cell 400.

The access unit 403 is configured to access the backhaul link according to the wireless resource scheduling information by using the first wireless resource.

The allocating unit 404 is configured to allocate a second wireless resource on the wireless backhaul link except the first wireless resource to an access link, where the access link is used for data transmission between the small cell 400 and a user equipment device.

The determining unit 405 is configured to determine, according to the load information, whether it is needed to perform a resource reallocation for the backhaul link.

For example, the load information includes a cache occupancy, and when more than 80% of a cache is occupied, it is determined that resource reallocation needs to be performed for the backhaul link. After it is determined that the resource reallocation needs to be performed for the backhaul link, the sending unit sends information for requesting backhaul link resource reallocation to the base station.

The receiving unit 402 is further configured to receive feedback instruction information from the base station. The feedback instruction information is generated by the base station according to the information for requesting backhaul link resource reallocation. The feedback instruction information instructs the small cell to report the load information and the channel state information to the base station.

Embodiment 4

Figure 5:
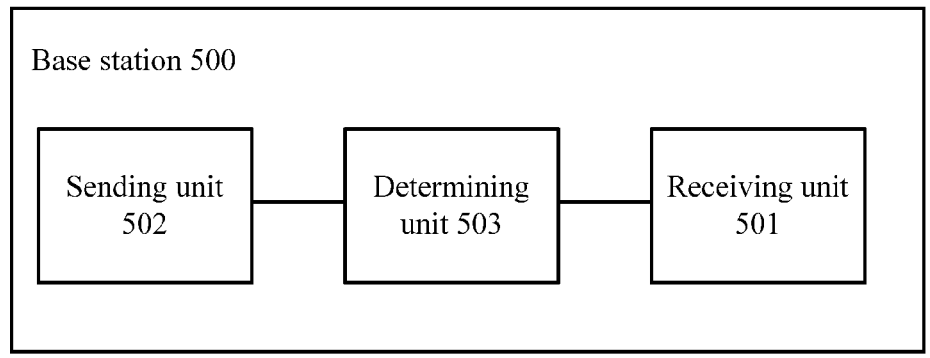
FIG. 5 is a functional block diagram of a base station according to Embodiment 4 of the present invention.

FIG. 5 is a functional block diagram of a base station according to Embodiment 4 of the present invention. As shown in FIG. 5, the base station 500 includes a receiving unit 501, a sending unit 502, and a determining unit 503. As understood by persons skilled in the art, these functional units can be realized by corresponding hardware components that constitute a base station of any type.

The receiving unit 501 is configured to receive load information and channel state information that reported by a small cell.

The sending unit 502 is configured to send link scheduling signaling to the small cell on a millimetric wave band according to the load information and the channel state information reported by the small cell. The link scheduling signaling includes routing information between multiple small cells and wireless resource scheduling information. The wireless resource scheduling information indicates a first wireless resource required by the small cell for accessing a wireless backhaul link. The coverage range of the small cell is within a coverage range of the base station.

The receiving unit 501 is further configured to receive information for requesting a backhaul link resource reallocation from the small cell.

The determining unit 503 is further configured to determine, according to load-related information of the backhaul link of the small cell, whether to perform wireless resource reallocation for the wireless backhaul link of the small cell.

When the determining unit 503 determines to perform the wireless resource reallocation, the sending unit sends feedback instruction information to the small cell. The feedback instruction information instructs the small cell to report load information and channel state information to the base station.

Embodiment 5

Figure 6:
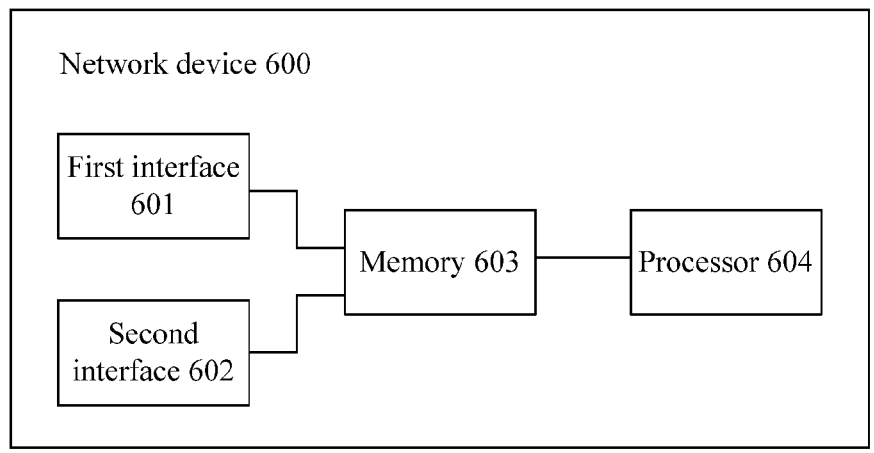
FIG. 6 is a simplified block diagram of a network device according to Embodiment 5 of the present invention.

FIG. 6 is a simplified block diagram of a network device according to Embodiment 5 of the present invention. As shown in FIG. 6, the network device 600 includes a first interface 601, a second interface 602, a memory 603, and a processor 604. The network device 600 is specifically a small cell. In addition, all network devices described in the following embodiments are small cells.

The first interface 601 is configured to communicate with a base station.

The second interface 602 is configured to communicate with a neighboring small cell or communicate with a user equipment device.

The memory 603 is configured to store communication information received from the base station, the neighboring small cell and the user equipment device.

The processor 604 is configured to perform processing functions by executing program instructions.

The network device 600 reports load information and channel state information of a channel between the network device 600 and the neighboring small cell to the base station by using the first interface 601. A coverage range of the network device 600 and a coverage range of the neighboring small cell are both within a coverage range of the base station. The network device 600 receives, through the first interface 601, link pre-scheduling signaling from the base station. The link pre-scheduling signaling is generated by the base station according to the load information and the channel state information. The link pre-scheduling signaling includes wireless resource occupation information. The wireless resource occupation information indicates an occupancy of a wireless resource of the neighboring small cell by a backhaul link. The network device 600 allocates, by using the second interface 602, a first wireless resource in available wireless resources to the backhaul link of the neighboring small cell according to the channel state information and the wireless resource occupation information.

The wireless resource occupation information specifically includes: routing information between the network device 600, the neighboring small cell and multiple other small cells; size information of wireless resources on the wireless backhaul link; information about master-slave relationships between the network device 600, the neighboring small cell, and the multiple other small cells; and measurement configuration information of the network device 600, the neighboring small cell, and the multiple other small cells. According to the received wireless resource occupation information and the channel state information, the network device 600 schedules the neighboring small cell to access the wireless backhaul link by using the first wireless resource. In addition, the network device 600 allocates a second wireless resource in the remaining available wireless resources to an access link by using the second interface 602, where the access link is used for data transmission between the network device 600 and the user equipment device.

Further, before the load information and the channel state information are reported to the base station by using the first interface 601, the network device 600 receives feedback period notification signaling from the base station through the first interface 601. A reporting period of the load information and the channel state information of the network device 600 is configured according to the feedback period notification signaling.

Specifically, the base station may respectively configure reporting periods of the network device 600 and the neighboring small cell, and notify the network device 600 and the neighboring small cell of the respective reporting periods by using higher layer signaling (for example, radio resource control (RRC) signaling) on corresponding millimetric wave bands (for example, the 3.5 GHz frequency band). Alternatively, the base station may further configure the reporting periods of the network device 600 and the neighboring small cell at the same time, and notify the network device 600 and all small cells within a coverage range of the base station the reporting periods by using broadcast signaling on corresponding millimetric wave bands.

Optionally, before the load information and the channel state information are reported to the base station by using the first interface 601, network device 600 determines whether a backhaul link resource needs to be reallocated. If the backhaul link resource needs to be reallocated, the network device 600 sends information for requesting backhaul link resource reallocation to the base station through the first interface 601. The network device 600 receives feedback instruction information from the base station. The feedback instruction is generated by the base station according to the information for requesting backhaul link resource reallocation. The feedback instruction information instructs the network device 600 to report the load information and the channel state information to the base station.

Specifically, the load information includes load information and cache information of the network device 600. When load reaches a specific degree or cache occupation exceeds a specific degree, the network device 600 confirms that a backhaul link resource of the network device 600 needs to be reallocated, and sends the information for requesting backhaul link resource reallocation to the base station. When determining that resource reallocation needs to be performed, the base station sends, by using corresponding higher layer signaling, the feedback instruction information to the network device 600 and a neighboring small cell that may be affected by the resource reallocation.

Further, after the feedback instruction information, which is sent by the base station according to the information for requesting backhaul link resource information, is received through the first interface 601, the network device 600 performs a channel measurement is performed on a channel between the network device 600 and the first small cell. Channel state information on the wireless backhaul link is obtained, where the channel state information includes link channel quality indicator information and beam pairing information.

After the load information and the channel state information are reported to the base station, the base station performs, according to the related information, pre-scheduling on a backhaul link between the network device 600 and the neighboring small cell or backhaul links between the network device 600 and multiple other small cells. The base station determines a route between the network device 600 and each small cell that are with the coverage range of the base station, a master-slave relationship between the small cells on each millimetric wave backhaul link, measurement configuration information of the small cells on each millimetric wave backhaul link, and information about a size of a wireless resource on each millimetric wave backhaul link. The base station notifies the network device 600 and each small cell of the foregoing information by using higher layer signaling (for example, RRC signaling) on the corresponding millimetric wave band. Configuration of the wireless resources may be indicated by using quantized bit information. For example, it is assumed that the configuration of the wireless resource is indicated by using two bits; then, 00 indicates "large", 01 indicates "medium", 10 indicates "small", and 11 indicates "reserved"; or eight possible wireless resource configurations may be indicated by using three bits.

Further, after the first wireless resource on the wireless backhaul link is scheduled by using the second interface 602, the wireless resource on the wireless backhaul link is scheduled according to the channel state information and wireless resource scheduling information. The wireless resource scheduling information is sent to the neighboring small cell through the second interface 602, so that the neighboring small cell accesses, according to the wireless resource scheduling information, the wireless backhaul link by using a corresponding resource.

Embodiment 6

Figure 7:
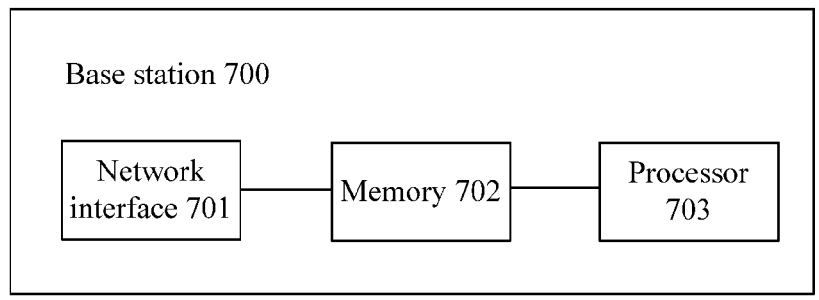
FIG. 7 is a simplified block diagram of a base station according to Embodiment 6 of the present invention.

FIG. 7 is a simplified block diagram of a base station according to Embodiment 6 of the present invention. The base station in this embodiment is a peer device of a network device in the foregoing Embodiment 5. As shown in FIG. 7, the base station 700 includes a communications interface 701, a memory 702, and a processor 703.

The communications interface 701 is configured to communicate with a small cell. The memory 702 is configured to store interaction information received by the communications interface 701. The processor 703 is configured to perform processing functions by executing program instructions. The base station 700 receives, through the communications interface 701, load information and channel state information that are reported by the small cell. The base station sends, through the communications interface 701, link pre-scheduling signaling to the small cell on a millimetric wave band. The link pre-scheduling signaling is generated according to the load information and the channel state information. The link pre-scheduling signaling includes wireless resource occupation information, and the wireless resource occupation information indicates an occupancy of a wireless resource of the small cell by a backhaul link.

Further, before the load information and the channel state information are received through the communications interface 701, the base station 700 configures reporting periods of load information and channel state information of multiple small cells. The base station 700 sends feedback period notification signaling to the small cell on the millimetric wave band through the communications interface 701.

Further, before receiving the load information and the channel state information through the communications interface 701, the base station 700 receives information for requesting backhaul link resource reallocation from the small cell through the communications interface 701. According to load-related information of the backhaul link of the small cell, the base station 700 determines whether wireless resource reallocation needs to be performed for the wireless backhaul link of the small cell. When it is determined that wireless resource reallocation needs to be performed for the wireless backhaul link of the small cell, the base station 700 sends feedback instruction information, through the communications interface 701, to the small cell. The feedback instruction information instructs the small cell to report load information and channel state information to the base station 700.

Then, the base station 700 performs pre-scheduling on a backhaul link between small cells according to related information fed back by the small cells. The base station 700 determines a route between small cells that are within coverage of the base station 700, a master-slave relationship of millimetric wave small cells on each millimetric wave backhaul link, measurement configuration information of the millimetric wave small cells on each millimetric wave backhaul link, and information about a size of a wireless resource on each millimetric wave backhaul link, and notifies a corresponding small cell of the foregoing information by using higher layer signaling (for example, RRC signaling) on a corresponding millimetric wave band.

Embodiment 7

Figure 8:
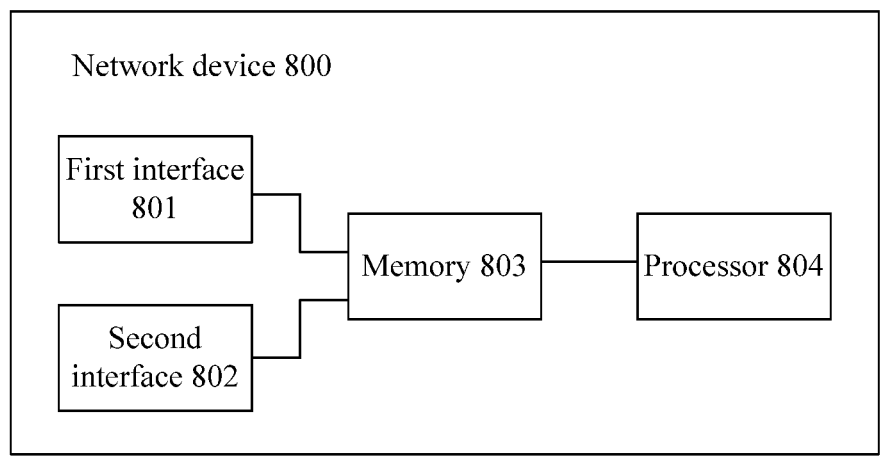
FIG. 8 is a simplified block diagram of a network device according to Embodiment 7 of the present invention.

FIG. 8 is a simplified block diagram of a network device according to Embodiment 7 of the present invention. As shown in FIG. 8, the network device 800 includes a first interface 801, a second interface 802, a memory 803, and a processor 804.

The first interface 801 is configured to communicate with a base station. The second interface 802 is configured to communicate with a first small cell or user equipment device. The memory 803 is configured to store interaction information received by the first interface 801 and the second interface 802. The processor 804 is configured to perform processing functions by executing program instructions.

The network device 800 reports, by using the first interface 801, load information and channel state information of a channel between the network device 800 and a neighboring small cell to the base station. A coverage range of the network device 800 and a coverage range of the neighboring small cell are within a coverage range of the base station. The network device 800 receives, through the first interface 801, link scheduling signaling from the base station. The link pre-scheduling signaling is generated by the base station according to the load information and the channel state information. The link scheduling signaling includes wireless resource scheduling information. The wireless resource scheduling information is used to allocate, to the network device 800, a first wireless resource required by a wireless backhaul link of the network device 800. The network device 800 accesses the backhaul link according to the wireless resource scheduling information by using the first wireless resource. The network device 800 allocates a second wireless resource on the wireless backhaul link except the first wireless resource to an access link by using the second interface 802, where the access link is used for data transmission between the network device 800 and the user equipment device.

Further, before the load information and the channel state information are reported to the base station by using the first interface 801, the network device 800 receives feedback period notification signaling from the base station through the first interface 801. A reporting period of the load information and the channel state information of the network device 800 is configured by the base station according to the feedback period notification signaling.

Specifically, the base station may respectively configure reporting periods of the network device 800 and the neighboring small cell, and notify the network device 800 and the neighboring small cell of the respective reporting periods by using higher layer signaling (for example, RRC signaling) on corresponding millimetric wave bands (for example, a 3.5 GHz frequency band). Alternatively, the base station may configure the reporting periods of the network device 800 and the neighboring small cell at same time, and notify the network device 800 and all the small cells within a coverage range of the base station of the reporting periods by using broadcast signaling on corresponding millimetric wave bands.

Further, before the load information and the channel state information are reported to the base station by using the first interface 801, the network device 800 determines whether there is a demand for backhaul link resource reallocation according to the load information. Information for requesting backhaul link resource reallocation is sent to the base station through the first interface 801. The network device 800 receives feedback instruction information from the base station through the first interface 801. The feedback instruction information is generated by the base station according to the information for requesting backhaul link resource reallocation received from the network device 800. The feedback instruction information is instructs the network device 800 to report the load information and the channel state information to the base station.

Specifically, the load information includes load information and cache information of the network device 800. When load reaches a specific degree or cache occupation exceeds a specific degree, the network device 800 confirms that a backhaul link resource of the network device 800 needs to be reallocated, and sends the information for requesting backhaul link resource reallocation to the base station. When determining that resource reallocation needs to be performed, the base station sends, by using corresponding higher layer signaling, the feedback instruction information to the network device 800 and a neighboring small cell that may be affected by the resource reallocation.

Embodiment 8

Figure 9:
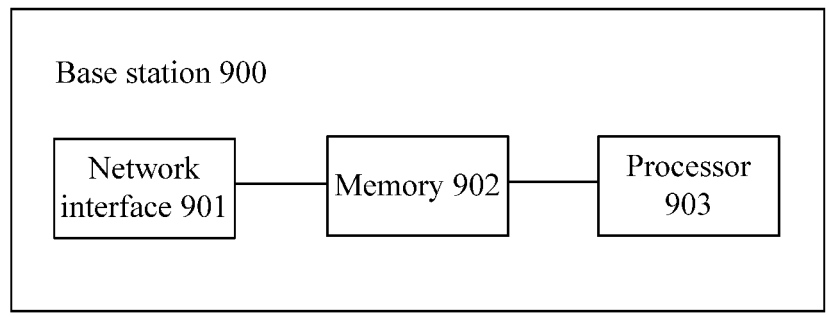
FIG. 9 is a simplified block diagram of a base station according to Embodiment 8 of the present invention.

FIG. 9 is a simplified block diagram of a base station according to Embodiment 8 of the present invention. The base station in this embodiment is a peer device of a network device in the foregoing Embodiment 7. As shown in FIG. 9, the base station 900 includes a communications interface 901, a memory 902, and a processor 903.

The communications interface 901 is configured to communicate with a small cell. The memory 902 is configured to store information received by the communications interface 901. The processor 903 is configured to perform processing functions by executing program instructions.

The base station 900 receives, through the communications interface 901, load information and channel state information from the small cell. The base station 900 sends, through the foregoing communications interface 901, link scheduling signaling to the small cell on a millimetric wave band according to the load information and the channel state information. The link scheduling signaling includes routing information between multiple small cells and wireless resource scheduling information. The wireless resource scheduling information is used to indicate a first wireless resource required for scheduling the small cell to access a wireless backhaul link. A coverage range of the small cell is within a coverage range of the base station 900.

Further, before the load information and the channel state information are received through the communications interface 901, the base station 900 configures reporting periods of load information and channel state information of multiple small cells. Feedback period notification signaling corresponding to the small cell is sent to the small cell on the millimetric wave band through the communications interface 901.

Further, before the load information and the channel state information that are reported by the small cell are received through the communications interface 901, information for requesting backhaul link resource reallocation sent by the small cell is received through the communications interface 901. According to load-related information of the backhaul link of the small cell, the base station 900 determines whether to perform wireless resource reallocation for the wireless backhaul link of the small cell. When it is determined to perform wireless resource reallocation on the wireless backhaul link of the small cell, feedback instruction information is sent to a small cell related to the wireless resource reallocation. The feedback instruction information is used to instruct the small cell related to the wireless resource reallocation to report load information and channel state information to the base station.

Then, the base station 900 performs scheduling on a backhaul link between small cells according to related information fed back by the small cells, determines a route between millimetric wave small cells that are within coverage of the base station 900 and wireless resource scheduling information on each millimetric wave backhaul link, and notifies each small cell of the foregoing information by using higher layer signaling (for example, RRC signaling) on a corresponding millimetric wave band, so that the small cell accesses a corresponding resource on the wireless backhaul link according to the wireless resource scheduling information.

Embodiment 9

Embodiment 9 of the present invention provides a method for scheduling a communications link resource, where the method is executed by the network device provided in Embodiment 5 of the present invention.

Figure 10:
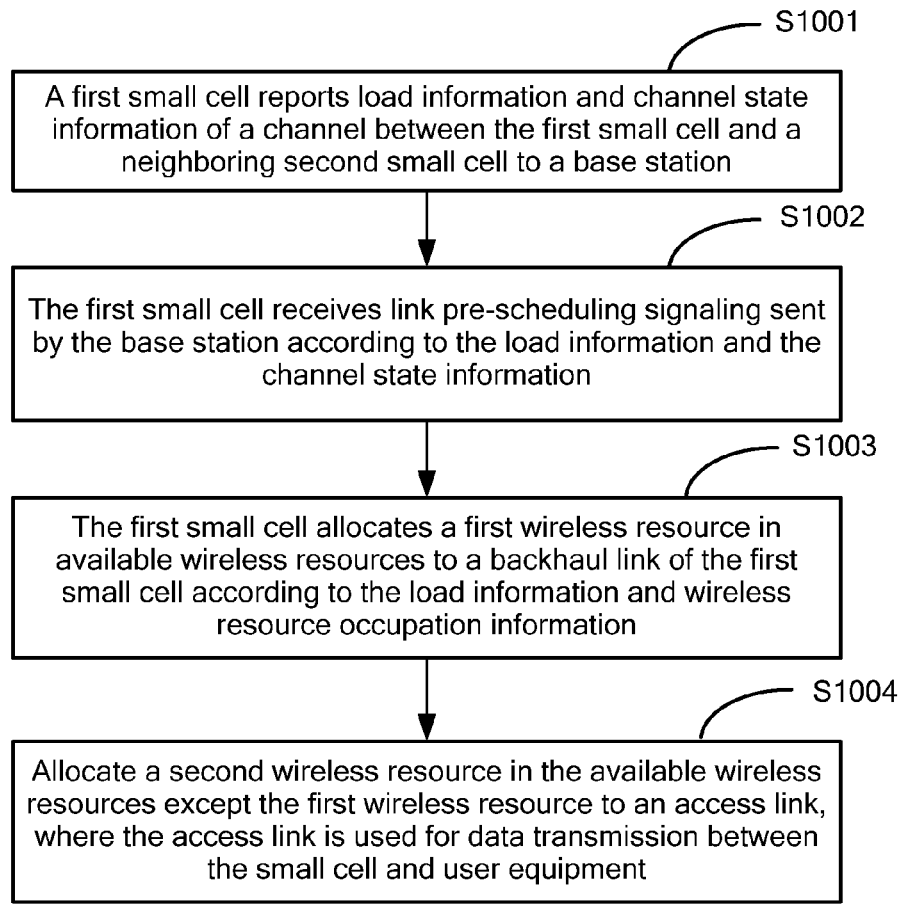
FIG. 10 is a flowchart of a method for scheduling a communications link resource according to Embodiment 9 of the present invention.

FIG. 10 is a flowchart of the method for scheduling a communications link resource according to this embodiment of the present invention. As shown in FIG. 10, the method for scheduling a communications link resource in this embodiment of the present invention includes the following steps:

S1001. A first small cell reports load information and channel state information of a channel between the first small cell and a neighboring second small cell to a base station, where both a coverage range of the first small cell and a coverage range of the second small cell are within a coverage range of the base station.

S1002. The first small cell receives link pre-scheduling signaling sent by the base station according to the load information and the channel state information, where the link pre-scheduling signaling includes wireless resource occupation information, and the wireless resource occupation information is used to indicate a case in which a wireless resource of the first small cell is occupied by a backhaul link.

In a specific example, the channel state information includes signal sensitivity, and when the signal sensitivity is less than a preset value, channel status is not good. Then the base station performs pre-scheduling on the backhaul link, and sends a wireless link scheduling instruction to the first small cell.

S1003. The first small cell allocates a first wireless resource in available wireless resources to the backhaul link of the first small cell according to the channel state information and the wireless resource occupation information; where the wireless resource occupation information specifically includes:

information about routes between multiple small cells, information about a size of a wireless resource on the wireless backhaul link, and master-salve relationship information and measurement configuration information of the multiple small cells.

S1004. Allocate a second wireless resource in the available wireless resources except the first wireless resource to an access link, where the access link is used for data transmission between the small cell and user equipment.

Preferably, before step S1001, the method further includes:

receiving feedback period notification signaling sent by the base station; and configuring a reporting period of the load information and the channel state information of the first small cell according to the feedback period notification signaling.

Preferably, before step S1001, the method further includes:

determining, by the first small cell, a demand for backhaul link resource reallocation according to the load information; sending information for requesting backhaul link resource reallocation to the base station; and receiving feedback instruction information sent by the base station according to the information for requesting backhaul link resource reallocation, where the feedback instruction information is used to instruct the small cell to report the load information and the channel state information to the base station.

Optionally, after the receiving feedback instruction information sent by the base station according to the information for requesting backhaul link resource reallocation, the method further includes:

performing, by the first small cell, channel measurement on a channel between the first small cell and the second small cell, and acquiring channel state information on the wireless backhaul link that is scheduled by the first small cell, where the channel state information includes link channel quality indication information and beam pairing information.

Preferably, after step S1003, the method further includes:

sending corresponding wireless resource scheduling information to the second small cell.

According to the method for scheduling a communications link resource in this embodiment of the present invention, a backhaul link resource is dynamically adjusted according to load of each small cell on a network, which improves resource usage efficiency of an entire network and increases a capacity of a system network.

Embodiment 10

Embodiment 10 of the present invention provides a method for scheduling a communications link resource, where the method is executed by the base station provided in Embodiment 6 of the present invention.

Figure 11:
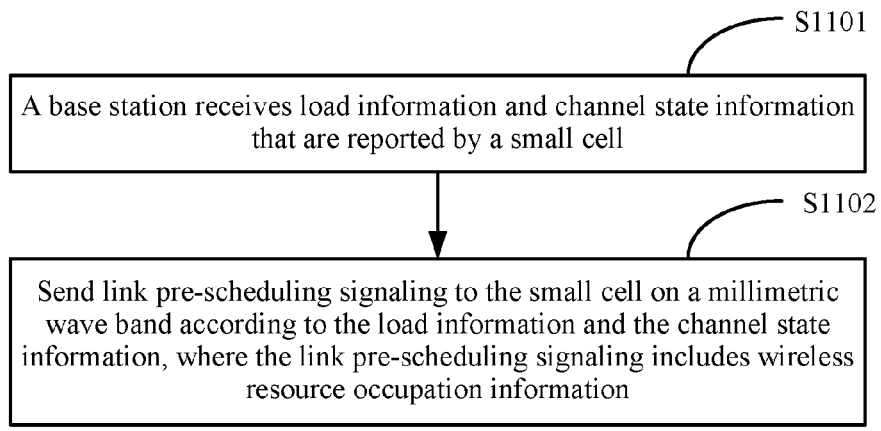
FIG. 11 is a flowchart of a method for scheduling a communications link resource according to Embodiment 10 of the present invention.

FIG. 11 is a flowchart of the method for scheduling a communications link resource according to this embodiment of the present invention. As shown in FIG. 11, the method for scheduling a communications link resource in this embodiment of the present invention includes the following steps:

S1101. The base station receives load information and channel state information that are reported by a small cell.

S1102. Send link pre-scheduling signaling to the small cell on a millimetric wave band according to the load information and the channel state information, where the link pre-scheduling signaling includes wireless resource occupation information, the wireless resource occupation information is used to indicate a case in which a wireless resource of the small cell is occupied by a backhaul link, and a coverage range of the small cell is within a coverage range of the base station.

The wireless resource occupation information includes:

information about routes between multiple small cells, information about a size of a wireless resource on a wireless backhaul link, and master-salve relationship information and measurement configuration information of the multiple small cells.

Preferably, before step S1101, the method further includes:

configuring, by the base station, reporting periods of load information and channel state information of the multiple small cells; and sending, to the small cell, feedback period notification signaling corresponding to the small cell on the millimetric wave band.

Preferably, before step S1101, the method further includes:

receiving, by the base station, information for requesting backhaul link resource reallocation that is sent by the small cell;

determining, according to load-related information of the backhaul link of the small cell, whether wireless resource reallocation needs to be performed for the wireless backhaul link of the small cell; and when it is determined that wireless resource reallocation needs to be performed for the wireless backhaul link of the small cell, sending feedback instruction information to a small cell related to the wireless resource reallocation, where the feedback instruction information is used to instruct the small cell related to the wireless resource reallocation to report load information and channel state information to the base station.

According to the method for scheduling a communications link resource in this embodiment of the present invention, a backhaul link resource is dynamically adjusted according to load of each small cell on a network, which improves resource usage efficiency of an entire network and increases a capacity of a system network.

The foregoing Embodiment 9 and Embodiment 10 briefly describe methods for scheduling a communications link resource, where each entity is an execution body. By using Embodiment 11, the following describes in detail a procedure of interaction between two entities, that is, a base station and a network device.

Embodiment 11

Figure 12:
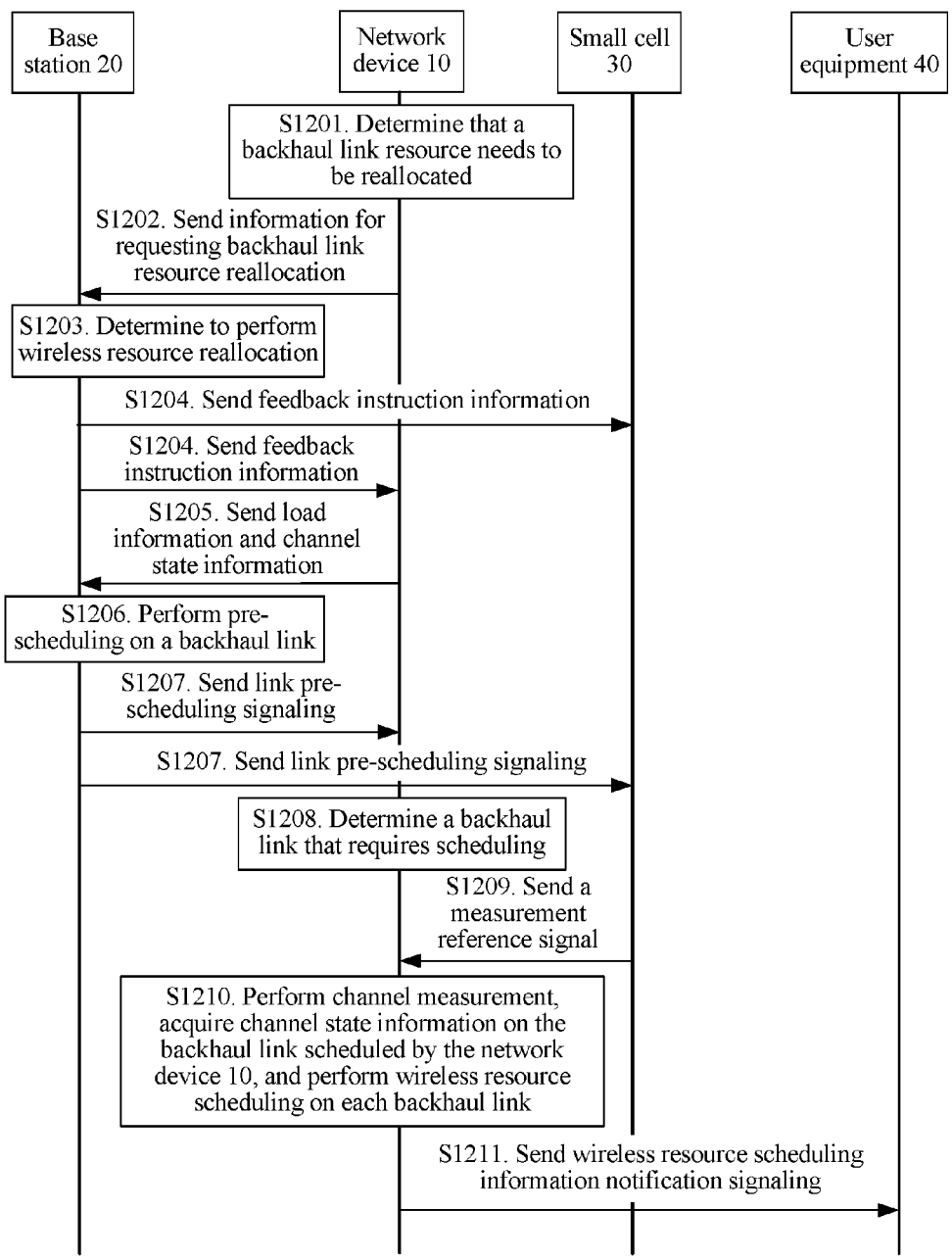
FIG. 12 is a signaling diagram of a method for scheduling a communications link resource according to Embodiment 11 of the present invention.

FIG. 12 is a signaling diagram of a method for scheduling a communications link resource according to this embodiment of the present invention, where the method specifically includes the following steps:

S1201. A network device 10 determines, according to load information of the network device 10, that a backhaul link resource of the network device 10 needs to be reallocated.

For example, the load information includes a cache occupation situation, and when more than 80% of a cache is occupied, it is determined that resource reallocation needs to be performed for a backhaul link.

S1202. After it is determined that reallocation is required, the network device 10 sends information for requesting backhaul link resource reallocation to a base station 20.

S1203. After the base station 20 receives the information for requesting backhaul link resource reallocation that is sent by the network device 10, it is determined, according to a current route and stored related information of the backhaul link, whether to perform wireless resource reallocation on a wireless backhaul link of the network device 10 that initiates the request.

If it is determined to perform resource reallocation, a small cell 30 that may be affected by the wireless resource reallocation is determined according to routing information.

S1204. The base station 20 sends, by using corresponding higher layer signaling, feedback instruction information to the network device 10 and the small cell 30 that may be affected by the wireless resource reallocation.

S1205. The network device 10 that receives the feedback instruction information sent by the base station 20 feeds back the load information of the network device 10 and channel state information of a channel between the network device 10 and a neighboring small cell 30 to the base station 20.

Specifically, the foregoing feedback instruction information may be periodically sent by the network device 10 to the base station 20. The base station 20 may configure a feedback period of the network device 10, and notify the network device 10 of the feedback period by using higher layer signaling (for example, RRC signaling) on a corresponding millimetric wave band (for example, 3.5 GHz frequency band). The base station 20 may further configure the feedback period of the network device 10, and notify the network device 10 of the feedback period by using broadcast signaling on the corresponding millimetric wave band.

S1206. The base station 20 performs pre-scheduling on a backhaul link between the network device 10 and the small cell 30 according to the load information and the channel state information of a channel between the network device 10 and the neighboring small cell 30 that are fed back by the network device 10, and determines a route between the network device 10 and the small cell 30 that are within a coverage range of the base station 20, a master-slave relationship between the network device 10 and the small cell 30 that are on each millimetric wave backhaul link, a master-slave relationship between the small cells 30 on each millimetric wave backhaul link, measurement configuration information of the network device 10, that of the small cell 30, that of the small cells 30 on each millimetric wave backhaul link, where the network device 10 and the small cell 30 are on each millimetric wave backhaul link, and information about a size of a wireless resource on each millimetric wave backhaul link.

S1207. The base station 20 notifies the network device 10 and the small cell 30 of the foregoing information by using link pre-scheduling signaling (for example, RRC signaling) on corresponding millimetric wave bands. The link pre-scheduling signaling includes wireless resource occupation information such as the foregoing route, the foregoing master-slave relationship, the measurement configuration information, and the information about a size of a wireless resource.

Specifically, the foregoing information about a size of a wireless resource may be indicated by using quantized bit information. For example, it is assumed that the information about a size of a wireless resource is indicated by using two bits; then, 00 indicates "large", 01 indicates "medium", 10 indicates "small", and 11 indicates "reserved"; or eight possible wireless resource configurations may be indicated by using three bits. All network devices 10 and small cells 30 that are within the coverage range of the base station 20 may be further notified of the foregoing scheduling information by using the broadcast signaling on the corresponding millimetric wave band.

S1208. The network device 10 determines, according to the received master-slave relationship on a related backhaul link of the network device 10, a backhaul link that requires scheduling.

Figure 13:
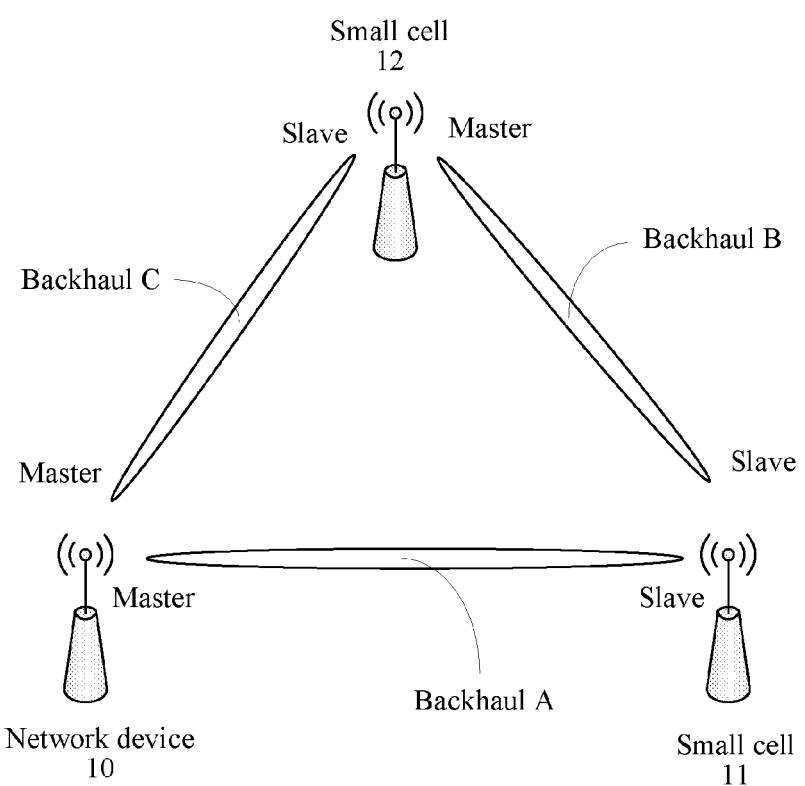
FIG. 13 is a schematic diagram of a backhaul link scheduling relationship between small cells according to Embodiment 11 of the present invention.

Specifically, as shown in FIG. 13, three backhaul links A to C are established between the network device 10, a small cell 11, and a small cell 12. After scheduling is performed by the base station 20, it is determined that on the backhaul link A, the network device 10 is a master small cell, and the small cell 11 is a slave small cell; on the backhaul link B, the small cell 12 is a master small cell, and the small cell 11 is a slave small cell; and on the backhaul link C, the network device 10 is a master small cell, and the small cell 12 is a slave small cell. According to the foregoing scheduling information, it is determined that the network device 10 needs to schedule a wireless resource on the backhaul link A and that on the backhaul link C, and the small cell 12 needs to schedule a wireless resource on the backhaul link B.

S1209. The small cell 30 sends a measurement reference signal on a specific millimetric wave band (for example, 28 GHz) according to the measurement configuration information received from the base station 20.

S1210. The network device 10 performs, according to the measurement configuration information received from the base station 20 and the measurement reference signal that is sent by the small cell 30 and received on a specific millimetric wave band (for example, 28 GHz), channel measurement on a channel between the network device 10 and the small cell 30, and acquires channel state information on a backhaul link scheduled by the network device 10, where the channel state information includes link channel quality indication information, beam pairing information, and the like. The network device 10 performs wireless resource scheduling on each backhaul link according to the channel state information on each backhaul link that is obtained by measurement, and the information about a size of a wireless resource on a backhaul link that is received from the base station 20.

S1211. The network device 10 sends wireless resource scheduling information on each backhaul link to each small cell 30 by using wireless resource scheduling information notification signaling.

As shown in FIG. 13, the network device 10 schedules the wireless resource on the wireless backhaul link A and that on the wireless backhaul link C, and sends, by using corresponding signaling, wireless resource scheduling information on the backhaul link A to the small cell 11 and wireless resource scheduling information on the backhaul link C to the small cell 12.

S1212. The network device 10 allocates, to an access link, another wireless resource except the wireless resource scheduled to the wireless backhaul link for use, where the access link is used for data transmission between the network device and user equipment 40; and sends notification signaling to the user equipment 40.

Embodiment 12

Embodiment 12 of the present invention provides a method for scheduling a communications link resource, where the method is executed by the network device provided in Embodiment 7 of the present invention.

Figure 14:
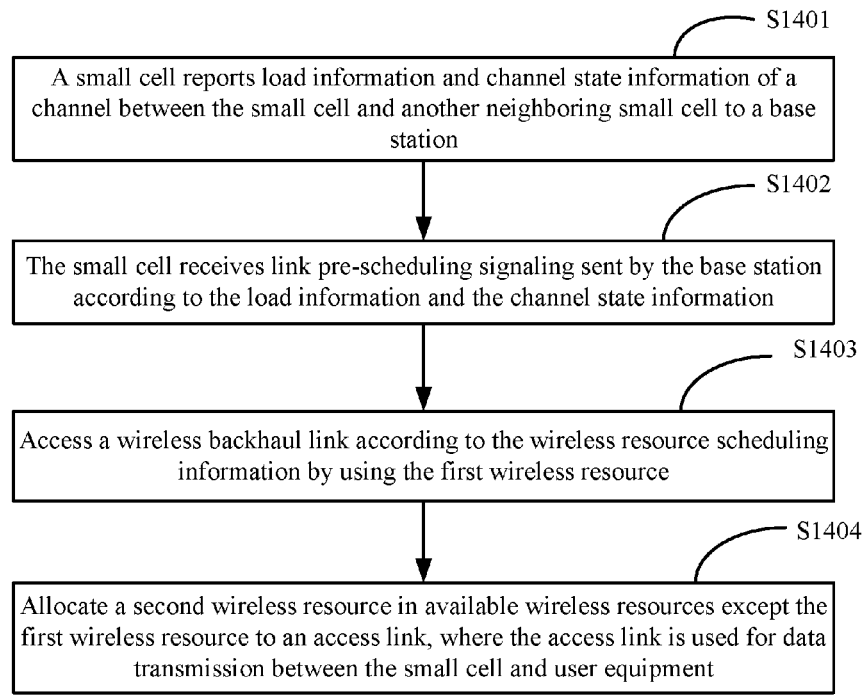
FIG. 14 is a flowchart of a method for scheduling a communications link resource according to Embodiment 12 of the present invention.

FIG. 14 is a flowchart of the method for scheduling a communications link resource according to this embodiment of the present invention. As shown in FIG. 14, the method for scheduling a communications link resource in this embodiment of the present invention includes the following steps:

S1401. A small cell reports load information and channel state information of a channel between the small cell and a neighboring small cell to a base station, where both a coverage range of the small cell and a coverage range of the neighboring small cell are within a coverage range of the base station.

S1402. The small cell receives link scheduling signaling sent by the base station according to the load information and the channel state information, where the link scheduling signaling includes wireless resource scheduling information, and the wireless resource scheduling information is used to allocate, to the small cell, a first wireless resource required by a wireless backhaul link of the small cell.

S1403. Access the wireless backhaul link according to the wireless resource scheduling information by using the first wireless resource.

S1404. Allocate a second wireless resource in available wireless resources except the first wireless resource to an access link, where the access link is used for data transmission between the small cell and user equipment.

Preferably, before step S1401, the method further includes:

receiving feedback period notification signaling sent by the base station; and configuring a reporting period of the load information and the channel state information of the small cell according to the feedback period notification signaling.

Preferably, before step S1401, the method further includes:

determining, by the small cell, a demand for backhaul link resource reallocation according to the load information;

sending information for requesting backhaul link resource reallocation to the base station; and receiving feedback instruction information sent by the base station according to the information for requesting backhaul link resource reallocation, where the feedback instruction information is used to instruct the small cell to report the load information and the channel state information to the base station.

According to the method for scheduling a communications link resource in this embodiment of the present invention, a backhaul link resource is dynamically adjusted according to load of each small cell on a network, which improves resource usage efficiency of an entire network and increases a capacity of a system network.

Embodiment 13

Embodiment 13 of the present invention provides a method for scheduling a communications link resource, where the method is executed by the base station provided in Embodiment 8.

Figure 15:
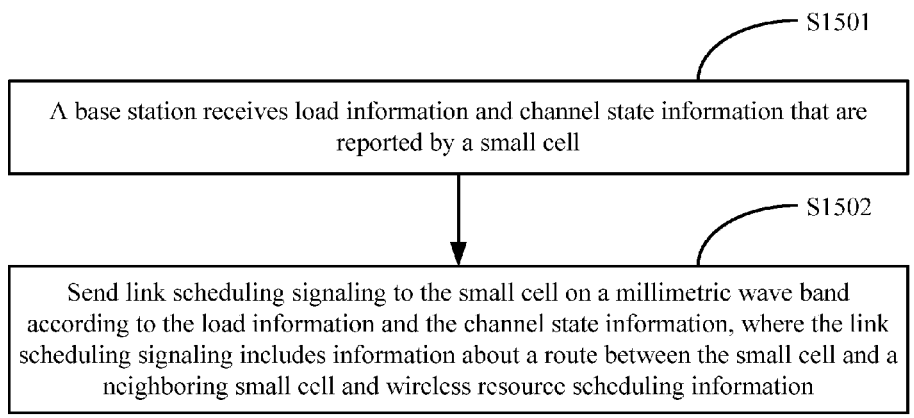
FIG. 15 is a flowchart of a method for scheduling a communications link resource according to Embodiment 13 of the present invention.

FIG. 15 is a flowchart of the method for scheduling a communications link resource according to this embodiment of the present invention. As shown in FIG. 15, the method for scheduling a communications link resource in this embodiment of the present invention includes the following steps:

S1501. The base station receives load information and channel state information that are reported by a small cell.

S1502. Send link scheduling signaling to the small cell on a millimetric wave band according to the load information and the channel state information, where the link scheduling signaling includes information about a route between the small cell and a neighboring small cell and wireless resource scheduling information, where the wireless resource scheduling information is used to indicate a first wireless resource required by the small cell to access a wireless backhaul link, and a coverage range of the small cell is within a coverage range of the base station.

Preferably, before step S1501, the method further includes:

configuring, by the base station, reporting periods of load information and channel state information of multiple small cells; and sending, to the small cell, feedback period notification signaling corresponding to the small cell on the millimetric wave band.

Preferably, before step S1501, the method further includes:

receiving, by the base station, information for requesting backhaul link resource reallocation that is sent by the small cell;

determining, according to load-related information of the backhaul link of the small cell, whether to perform wireless resource reallocation for the wireless backhaul link of the small cell; and when it is determined to perform wireless resource reallocation, sending feedback instruction information to a small cell related to the wireless resource reallocation, where the feedback instruction information is used to instruct the small cell related to the wireless resource reallocation to report load information and channel state information to the base station.

According to the method for scheduling a communications link resource in this embodiment of the present invention, a backhaul link resource is dynamically adjusted according to load of each small cell on a network, which improves resource usage efficiency of an entire network and increases a capacity of a system network.

The foregoing Embodiment 12 and Embodiment 13 briefly describe methods for scheduling a communications link resource, where each entity is an execution body. By using Embodiment 14, the following describes in detail a procedure of interaction between two entities, that is, a base station and a network device.

Embodiment 14

Figure 16:
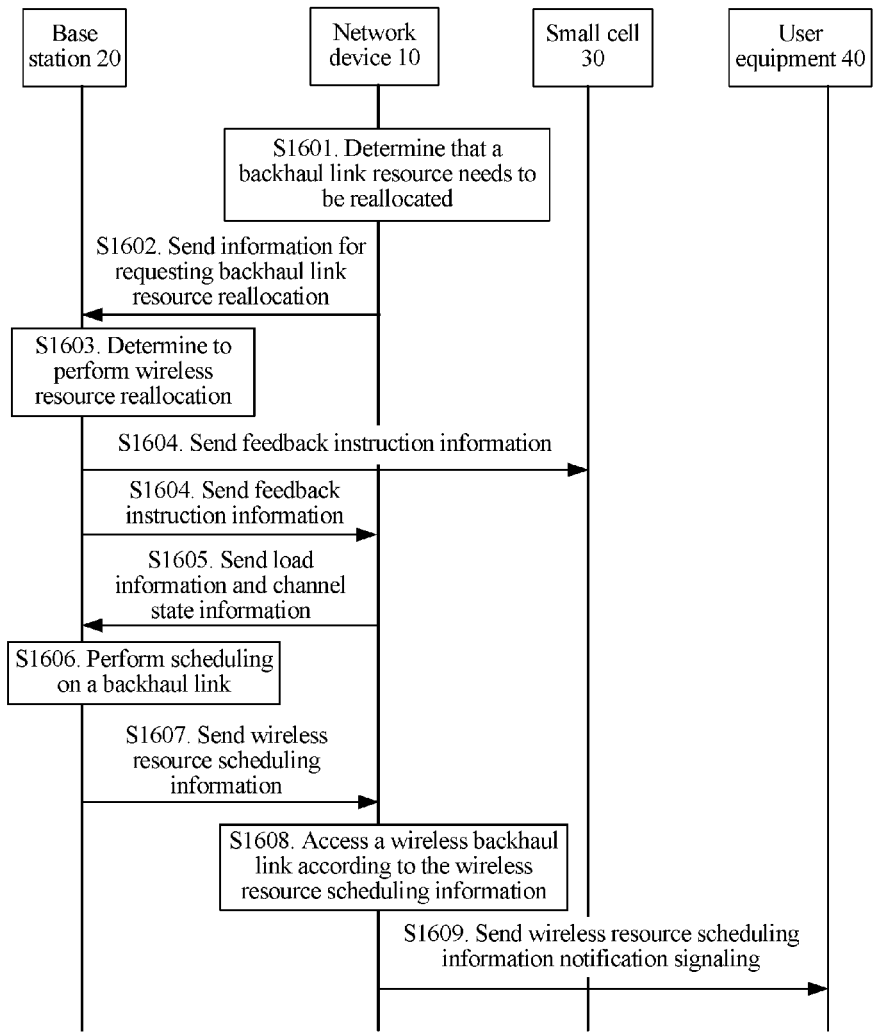
FIG. 16 is a signaling diagram of a method for scheduling a communications link resource according to Embodiment 14 of the present invention.

FIG. 16 is a signaling diagram of a method for scheduling a communications link resource according to this embodiment of the present invention, where the method specifically includes the following steps:

S1601. A network device 10 determines, according to load information and cache information of the network device 10, that a backhaul link resource of the network device 10 needs to be reallocated.

S1602. The network device 10 sends information for requesting backhaul link resource reallocation to the base station 20.

S1603. After the base station 20 receives the information for requesting backhaul link resource reallocation that is sent by the network device 10, determine, according to a current route and stored related information of a backhaul link, whether to perform wireless resource reallocation on a wireless backhaul link of a millimetric wave small cell that initiates the request.

If it is determined to perform resource reallocation, a network device 10 and a small cell 30 that may be affected by the wireless resource reallocation are determined according to routing information.

S1604. The base station 20 sends, by using corresponding higher layer signaling, feedback instruction information to the network device 10 and a first small cell 30 that may be affected by the resource reallocation.

S1605. The network device 10 that receives the feedback instruction information sent by the base station 20 feeds back the load information of the network device 10 and channel state information of a channel between the network device 10 and a neighboring small cell 30 to the base station 20.

Specifically, the base station 20 may configure a feedback period of the network device 10, and notify the network device 10 of the feedback period by using higher layer signaling (for example, RRC signaling) on a corresponding millimetric wave band (for example, 3.5 GHz frequency band). The base station 20 may further configure the feedback period of the network device 10, and notify the network device 10 of the feedback period by using broadcast signaling on the corresponding millimetric wave band.

S1606. The base station 20 performs scheduling on a backhaul link between the network device 10 and the small cell 30 according to the load information fed back by the network device 10 and the channel state information of a channel between the network device 10 and the neighboring small cell 30, and determines a route between the network device 10 and the small cell 30 that are within a coverage range of the base station 20, and wireless resource scheduling information on each millimetric wave backhaul link.

S1607. Notify the network device 10 of the foregoing information by using link scheduling signaling (for example, RRC signaling) on the corresponding millimetric wave band, where the link scheduling signaling includes wireless resource scheduling information.

S1608. The network device 10 accesses the wireless backhaul link according to the wireless resource scheduling information.

S1609. The network device 10 allocates, to an access link, another wireless resource except a wireless resource scheduled to the wireless backhaul link for use, where the access link is used for data transmission between the network device and user equipment 40; and sends wireless resource scheduling information notification signaling to the user equipment 40.

Embodiment 15

Embodiment 15 of the present invention further provides a communications system, including the network device provided in the foregoing Embodiment 5 and the base station provided in the foregoing Embodiment 6.

The base station updates a route of a wireless backhaul link, determines a size of a wireless resource required by each wireless backhaul link, and sends wireless resource occupation information to the network device.

The network device allocates a first wireless resource in available wireless resources to a backhaul link according to the received wireless resource occupation information.

The network device allocates a second wireless resource in the available wireless resources except the first wireless resource to an access link, and notifies user equipment of the allocation.

A specific procedure of the foregoing steps has been disclosed in the foregoing embodiments, and details are not described herein again.

An execution period of the step in which the base station determines the size of the wireless resource required by each wireless backhaul link and sends the wireless resource occupation information to the network device is greater than a period of the step in which the network device schedules the first wireless resource on the wireless backhaul link.

The period of the step in which the network device schedules the first wireless resource on the wireless backhaul link is greater than a period of the step in which the network device allocates the second wireless resource on the wireless backhaul link except the first wireless resource to the access link.

Preferably, the step in which the base station determines the size of the wireless resource required by each wireless backhaul link and sends the wireless resource occupation information to the network device is performed in a long period, and the period of the step may reach a level of seconds. For example, the step is performed per second. The step in which the network device schedules the first wireless resource on the wireless backhaul link is performed in a medium period, and the period of the step may reach a level of hundreds of milliseconds. For example, the period is 320 ms. The step in which the network device allocates the second wireless resource on the wireless backhaul link to the access link is performed in a short period, and generally the period is a time length of a subframe, for example, 1 ms or even shorter.

According to the communications system provided in this embodiment of the present invention, a backhaul link resource is dynamically adjusted according to load of each small cell in a communications network, which improves resource usage efficiency of an entire network and increases a capacity of a system network. By using hierarchical scheduling, overheads of signaling in a system are reduced, which effectively reduces complexity of a scheduler.

Embodiment 16

Embodiment 16 of the present invention further provides a communications system, including the network device provided in the foregoing Embodiment 7 and the base station provided in the foregoing Embodiment 8.

The base station updates a route of a wireless backhaul link, allocates a first wireless resource in available wireless resources to a backhaul link of the network device, and notifies the network device of the allocation.

The network device accesses the backhaul link by using the first wireless resource, and notifies user equipment of the allocation.

A specific procedure of the foregoing steps has been disclosed in the foregoing embodiments, and details are not described herein again.

An execution period of the step in which the base station schedules a wireless resource required by each wireless backhaul link and notifies the network device of the allocation is greater than a period of the step in which the network device accesses the wireless resource and notifies the user equipment of the allocation.

Preferably, the step in which the base station schedules the wireless resource required by each wireless backhaul link is performed in a relatively long period, and the period of the step may reach a level of hundreds of milliseconds. For example, the period is 320 ms. The step in which the network device accesses the wireless resource and notifies the user equipment of the allocation is performed in a short period, and generally the period is a time length of a subframe, for example, 1 ms or even shorter.

According to the communications system provided in this embodiment of the present invention, a backhaul link resource is dynamically adjusted according to load of each small cell in a communications network, which improves resource usage efficiency of an entire network and increases a capacity of a system network. By using hierarchical scheduling, overheads of signaling in a system are reduced, which effectively reduces complexity of a scheduler.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A network device serving as a small cell in a wireless radio network, comprising:
   a transmitter, configured to report load information and channel state information of a channel between the small cell and a neighboring small cell to a base station, wherein a coverage range of the small cell and a coverage range of the neighboring small cell are both within a coverage range of the base station;
   a receiver, configured to receive link pre-scheduling signaling from the base station,
      wherein the link pre-scheduling signaling is generated by the base station according to the load information and the channel state information,
      wherein the link pre-scheduling signaling comprises wireless resource occupation information indicating an occupancy of a wireless resource of the small cell by a backhaul link, and
      wherein the wireless resource occupation information comprises routing information between multiple small cells, size information of wireless resources on the backhaul link, master-slave configuration information, and measurement configuration information of the multiple small cells;
   a processor, configured to:
   allocate a first wireless resource in available wireless resources to the backhaul link of the small cell according to the channel state information and the wireless resource occupation information,
   scheduling the neighboring small cell to access the backhaul link via the first wireless resource, and
   allocate a second wireless resource in the remaining available wireless resources to an access link, wherein the access link is used for data transmission between the small cell and a user equipment device.

2. The network device according to claim 1,
   wherein the processor is further configured to:
   determine, according to the load information, whether to perform a resource reallocation needs for the backhaul link;
   wherein the transmitter is further configured to:
   based on a determination that the resource reallocation needs to be performed for the backhaul link, send information for requesting backhaul link resource reallocation to the base station;

and wherein the receiver is further configured to:
   receive feedback instruction information from the base station,
   wherein the feedback instruction is generated by the base station according to the information for requesting backhaul link resource reallocation, wherein the feedback instruction information instructs the small cell to report the load information and the channel state information to the base station.

3. A base station, comprising:
   a receiver, configured to receive load information and channel state information from a network device that acts as a small cell in a wireless radio network, wherein a coverage range of the small cell is within a coverage range of the base station; and
   a transmitter, configured to send link pre-scheduling signaling to the small cell on a millimetric wave band according to the load information and the channel state information,
   wherein the link pre-scheduling signaling comprises wireless resource occupation information indicating an occupancy of a wireless resource of the small cell by a backhaul link,
   wherein the wireless resource occupation information comprises routing information between multiple small cells, size information of wireless resources on the backhaul link, master-slave configuration information, and measurement configuration information of the multiple small cells, and
   wherein the link pre-scheduling signaling enables allocation of a first wireless resource in available wireless resources to the backhaul link, the first wireless resource used by the small cell in scheduling a neighboring small cell to access the backhaul link.

4. The base station according to claim 3, wherein the base station further comprises a processor;
   wherein the receiver is further configured to receive information for requesting backhaul link resource reallocation from the small cell;
   wherein the processor is configured to determine, according to load-related information of the backhaul link of the small cell, whether a wireless resource reallocation needs to be performed for the backhaul link of the small cell; and
   wherein the transmitter is further configured to:
   based on a determination that the wireless resource reallocation needs to be performed, send feedback instruction information to the small cell, wherein the feedback instruction information instructs the small cell to report load information and channel state information to the base station.

5. A method for scheduling a communications link resource, comprising:
   reporting, by a first small cell, load information and channel state information of a channel between the first small cell and a neighboring second small cell to a base station, wherein a coverage range of the first small cell and a coverage range of the second small cell are both within a coverage range of the base station;
   receiving, by the first small cell, link pre-scheduling signaling from the base station,
      wherein the link pre-scheduling signaling is generated by the base station according to the load information and the channel state information,
      wherein the link pre-scheduling signaling comprises wireless resource occupation information indicating an occupancy of a wireless resource of the first small cell by a backhaul link, and wherein the wireless resource occupation information comprises routing information between multiple small cells, size information of wireless resources on the backhaul link, master-slave configuration information, and measurement configuration information of the multiple small cells;

allocating, by the first small cell, a first wireless resource in available wireless resources to the backhaul link of the first small cell according to the channel state information and the wireless resource occupation information;

scheduling, by the first small cell, the neighboring small cell to access the wireless backhaul link via the first wireless resource; and allocating, by the first small cell, a second wireless resource in the remaining available wireless resources to an access link, wherein the access link is used for data transmission between the first small cell and a user equipment device.

6. The method according to claim 5, wherein before the reporting the load information and channel state information to the base station, the method further comprises:

determining, by the first small cell according to the load information, whether a resource reallocation needs to be performed for a backhaul link;

based on a determination that the wireless resource reallocation needs to be performed, sending, by the first small cell, information for requesting backhaul link resource reallocation to the base station; and receiving, by the first small cell, feedback instruction information from the base station, wherein the feedback instruction is generated by the base station according to the information for requesting backhaul link resource reallocation, and wherein the feedback instruction information instructs the first small cell to report the load information and the channel state information to the base station.

7. A method for scheduling a communications link resource, comprising:

receiving, by a base station, load information and channel state information from a small cell, wherein a coverage range of the small cell is within a coverage range of the base station; and sending, by the base station, link pre-scheduling signaling to the small cell on a millimetric wave band, wherein the link pre-scheduling signaling is generated by the base station according to the load information and the channel state information, wherein the link pre-scheduling signaling comprises wireless resource occupation information indicating an occupancy of a wireless resource by a backhaul link, wherein the wireless resource occupation information comprises routing information between multiple small cells, size information of wireless resources on the backhaul link, master-slave configuration information, and measurement configuration information of the multiple small cells, and wherein the link pre-scheduling signaling enables allocation of a first wireless resource in available wireless resources to the backhaul link, the first wireless resource used by the small cell in scheduling a neighboring small cell to access the backhaul link.

8. The method according to claim 7, wherein before receiving the load information and channel state information from the small cell, the method further comprises:

receiving, by the base station, information for requesting a backhaul link resource reallocation from the small cell;

determining, according to load-related information of the backhaul link of the small cell, whether to perform the wireless resource reallocation for the backhaul link of the small cell; and when it is determined to perform the wireless resource reallocation, sending feedback instruction information to the small cell, wherein the feedback instruction information instructs the small cell to report load information and channel state information to the base station.

9. The network device according to claim 1, wherein the multiple small cells include the small cell and the neighboring small cell.

10. The base station according to claim 3, wherein the multiple small cells include the small cell and the neighboring small cell.

11. The method according to claim 5, wherein the multiple small cells include the small cell and the neighboring small cell.

12. The method according to claim 7, wherein the multiple small cells include the small cell and the neighboring small cell.

* * * * *